United States Patent
Pawar et al.

(10) Patent No.: US 9,807,766 B1
(45) Date of Patent: Oct. 31, 2017

(54) METHOD AND SYSTEM FOR COMPONENT CARRIER SELECTION BASED ON CONTENT TYPE

(71) Applicant: Sprint Spectrum L.P., Overland Park, KS (US)

(72) Inventors: Hemanth B. Pawar, Brambleton, VA (US); Shilpa Kowdley Srinivas, Brambleton, VA (US); Krishna Sitaram, Chantilly, VA (US); Chunmei Liu, Great Falls, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 167 days.

(21) Appl. No.: 14/609,617

(22) Filed: Jan. 30, 2015

(51) Int. Cl.
　　*G01R 31/08*　　(2006.01)
　　*H04L 5/14*　　(2006.01)
　　*H04B 7/00*　　(2006.01)
　　*H04J 3/00*　　(2006.01)
　　*H04W 72/04*　　(2009.01)

(52) U.S. Cl.
　　CPC ............................... *H04W 72/0453* (2013.01)

(58) Field of Classification Search
　　CPC ............... H04W 72/0453; H04L 29/06; H04L 29/08072; H04L 5/1423
　　See application file for complete search history.

(56) References Cited

U.S. PATENT DOCUMENTS

| | | | |
|---|---|---|---|
| 6,721,569 B1 | 4/2004 | Hashem et al. | |
| 8,578,015 B2 | 11/2013 | Billhartz | |
| 2008/0013480 A1 | 1/2008 | Kapoor et al. | |
| 2008/0254833 A1 | 10/2008 | Keevill et al. | |
| 2009/0141677 A1* | 6/2009 | Maas | H04L 47/10 370/329 |
| 2010/0093281 A1 | 4/2010 | Khanka et al. | |
| 2012/0252477 A1 | 10/2012 | Rao | |
| 2013/0010711 A1 | 1/2013 | Larsson et al. | |
| 2013/0109372 A1 | 5/2013 | Ekici | |
| 2013/0176952 A1* | 7/2013 | Shin | H04L 5/001 370/329 |
| 2013/0176957 A1* | 7/2013 | Gao | H04L 5/0007 370/329 |

(Continued)

OTHER PUBLICATIONS

U.S. Appl. No. 13/964,929, filed Aug. 12, 2013, entitled "Methods and Systems for Selecting requency Bands for a Radio Connection".

*Primary Examiner* — Faruk Hamza
*Assistant Examiner* — Abu-Sayeed Haque

(57) ABSTRACT

A method and system for selecting carrier frequencies to use as a user equipment device's (UE's) primary component carrier (PCell) and secondary component carrier (SCell) for carrier aggregation service, based on consideration of the type of content that will be transmitted to or from the UE. A base station that is arranged to operate on a plurality of carrier frequencies may determine a type of content that will be communicated between the base station and a UE being served by the base station. Based on the determined type of content, the base station may select a first carrier frequency of the plurality to use as a PCell and may further select a second carrier frequency of the plurality to use as an SCell. The base station may then provide the UE with carrier aggregation service concurrently on the PCell and SCell.

20 Claims, 4 Drawing Sheets

(56) References Cited

U.S. PATENT DOCUMENTS

| | | | |
|---|---|---|---|
| 2013/0190027 A1 | 7/2013 | Cao et al. | |
| 2014/0016594 A1* | 1/2014 | Han | H04L 5/001 |
| | | | 370/329 |
| 2014/0023017 A1 | 1/2014 | Karls et al. | |
| 2014/0119263 A1* | 5/2014 | Shauh | H04W 72/005 |
| | | | 370/312 |
| 2014/0177607 A1* | 6/2014 | Li | H04W 74/0833 |
| | | | 370/336 |
| 2014/0233502 A1* | 8/2014 | Fong | H04W 72/02 |
| | | | 370/329 |
| 2015/0092652 A1* | 4/2015 | Ramamurthy | H04W 72/005 |
| | | | 370/312 |
| 2015/0180617 A1* | 6/2015 | Sun | H04L 1/1854 |
| | | | 370/329 |
| 2015/0195077 A1* | 7/2015 | Kim | H04L 5/0048 |
| | | | 370/329 |
| 2015/0245376 A1* | 8/2015 | Bashar | H04L 1/18 |
| | | | 370/277 |
| 2015/0334702 A1* | 11/2015 | Ji | H04W 72/1257 |
| | | | 370/280 |
| 2015/0350094 A1* | 12/2015 | Izhak-Ratzin | H04L 47/2441 |
| | | | 370/235 |
| 2016/0057066 A1* | 2/2016 | Gasparakis | H04L 47/33 |
| | | | 709/226 |
| 2016/0057684 A1* | 2/2016 | Larsson | H04W 36/26 |
| | | | 370/331 |
| 2016/0192379 A1* | 6/2016 | Behravan | H04W 72/04 |
| | | | 370/329 |
| 2016/0210241 A1* | 7/2016 | Jacobs | G06F 12/0246 |

* cited by examiner

METHOD AND SYSTEM FOR COMPONENT CARRIER SELECTION BASED ON CONTENT TYPE

BACKGROUND

In a wireless communication system, a base station may provide one or more coverage areas, such as cells or sectors, in which the base station may serve user equipment devices (UEs), such as cell phones, wirelessly-equipped personal computers or tablets, tracking devices, embedded wireless communication modules, or other devices equipped with wireless communication functionality (whether or not operated by a human user).

In general, each coverage area may operate on one or more carriers each defining one or more ranges of frequency spectrum and having a respective "downlink channel" for carrying communications from the base station to UEs and a respective "uplink channel" for carrying communications from the UEs to the base station. Such carriers may be frequency division duplex (FDD), in which the downlink and uplink channels are defined as separate respective ranges of frequency, or time division duplex (TDD), in which the downlink and uplink channels are defined on a common range of frequency but distinguished through time division multiplexing. Further, the downlink channel and uplink channel of each carrier may also be divided into respective sub-channels for carrying particular communications, such as one or more control channels for carrying control signaling and one or more traffic channels for carrying application-layer data and other traffic.

For instance, in a system operating according to an orthogonal frequency division multiple access (OFDMA) protocol, such as the Long Term Evolution (LTE) standard of the Universal Mobile Telecommunications System (UMTS) for example, the air interface is divided over time into frames and sub-frames each defining two slots, and the uplink and downlink channels are each divided over their frequency bandwidth into sub-carriers that are grouped within each slot into resource blocks. When a UE is positioned within coverage of a base station in such a system, the UE may register or "attach" with the base station on a particular carrier on which the base station is configured to schedule particular downlink and uplink resource blocks to carry data communications to and from the UE. Further, the base station and UE may modulate their air interface data communications at a coding rate selected based on quality of the UE's coverage, such as with higher rate coding rate when the UE is in better coverage of the base station and with a lower coding rate when the UE is in worse coverage of the base station.

In such an LTE system, for instance, when the base station has data to transmit to a UE, the base station may assign certain downlink resource blocks (and thus certain sub-carriers) in a given sub-frame for use to carry the data to the UE at a particular coding rate, and the base station may then (i) transmit to the UE in that sub-frame a downlink control information (DCI) message that specifies the assigned resource blocks and coding rate and (ii) encode and transmit the data to the UE in the assigned resource blocks in that sub-frame. Per the DCI message, the UE would then read the transmitted data from the assigned resource blocks. Likewise, when the UE has data to transmit to the base station and accordingly transmits a scheduling request to the base station, the base station may assign certain uplink resource blocks in a given sub-frame for use to carry the data from the UE at a particular coding rate and may transmit to the UE, in advance of that sub-frame, a DCI message that specifies the assigned resource blocks and coding rate. And the UE may then encode and transmit the data to the base station in the assigned resource blocks in that sub-frame.

With such an arrangement, the bandwidth of the carrier on which the base station serves a UE may pose an effective limit on the peak rate of data communication between the base station and the UE, as the bandwidth would define only a limited number of resource blocks per slot, with data rate per resource block being further limited based on air interface conditions. By way of example, in accordance with the LTE standard, a TDD carrier may be up to 20 MHz wide. Depending on the TDD frame format (e.g., how many sub-frames per frame are used for downlink versus uplink) and other factors, such a carrier may accommodate peak downlink data rate of only about 60 megabits per second (Mbps).

One way to help overcome this per-carrier data rate limitation is to have a base station serve a UE on multiple carriers at once, providing what is known as "carrier aggregation" service. With carrier aggregation service, multiple carriers from either contiguous frequency bands or non-contiguous frequency bands are aggregated together as "component carriers" to increase the overall bandwidth available per slot by providing a greater extent of air interface resources in which the base station can schedule uplink and downlink communication. For instance, if a base station serves a UE on two 20 MHz TDD LTE carriers at once, the peak throughput may be about 120 Mbps. And if the base station serves a UE on three 20 MHz TDD LTE carriers at once, the peak throughput may be as high as 180 Mbps. With carrier aggregation, one of the carriers may be deemed to be a primary carrier or primary cell (PCell) and each other carrier may be deemed to be a secondary carrier or secondary cell (SCell). In some scenarios, communication of bearer data and control signaling associated with the bearer data may occur on the PCell, whereas only communication of bearer data may occur on an SCell. In other scenarios, however, it is possible for such control signaling to occur on the PCell, as well as on at least one SCell.

Overview

At issue in a carrier aggregation scenario is which of a base station's available carriers should be used as the PCell and which carrier(s) should be used as the SCell(s). Disclosed herein is a method and system for selecting which carriers to use as a UE's PCell and SCell(s) when providing the UE with carrier aggregation service, based on consideration of the type of content that will be communicated to or from the UE. In particular, the disclosure provides for determining a type of content that will be communicated to or from a UE and, based on the determined type of content, selecting (i) an available carrier to use as a PCell on which the base station will serve the UE with communication of the determined type of content and (ii) one or more other available carriers to use as one or more SCells on which the base station will serve the UE with communication of other types of content. The disclosure then provides for serving the UE with carrier aggregation on the selected PCell and the selected one or more SCells. Namely, the UE will be served concurrently with (i) communication of the determined type of content, as well as control signaling associated with the determined type of content, on the PCell and (ii) communication of other types of content on the selected one or more SCells.

By way of example, in accordance with the disclosure, the base station at issue may be set to use a first carrier as a preferred PCell on which to serve UEs with communication of a first type of content (e.g., voice content, such as Voice over Internet Protocol (VoIP) content), and to further use one or more other available carriers as one or more SCell(s) on which to serve UEs with communication of other types of content. Whereas, the base station may also be set to use a second carrier, different from the first carrier, as a preferred PCell on which to serve UEs with communication of a second type of content (e.g., video streaming data), and to further use one or more other available carriers as one or more SCells on which to serve UEs with communication of other types of content. Accordingly, in this example, whenever the base station determines that the first type of content will be communicated to or from the UE, the base station will select the first carrier to use as the UE's PCell, and whenever the base station determines that the second type of content will be communicated to or from the UE, the base station will select the second carrier to use as the UE's PCell.

This arrangement may provide various benefits to an operator of a wireless communication system. For example, in practice, when the base station is providing UEs with carrier aggregation service, some carriers may be better suited to be used as a PCell for serving UEs with communication of certain types of content than other carriers. For instance, a carrier with limited air interface resources may be not be a desirable PCell for serving UEs with communication of a particular type of content (e.g., video streaming data) when such content may require a greater extent of resources in order to provide a desirable quality of service. Whereas, a carrier that has more air interface resources available may be a desirable PCell for serving UEs with communication of such content while providing a desirable quality of service. Thus, it may be desirable for the operator to ensure that communication of the particular type of content will occur on a desirable PCell, which would enable the base station to serve UEs concurrently with (i) communication of the particular type of content on the PCell and (ii) communication of other types of content on one or more SCells, as noted above.

As another benefit, this arrangement may facilitate service policy consistency and ease of management. For instance, when the base station is providing UEs with carrier aggregation service, most or all of a particular type of content that is communicated to and from the UEs will be communicated on the carrier that the base station selected to be the PCell on which to serve UEs with communication of the particular type of content. In such a scenario, the operator can impose a particular service policy on that carrier, such that all communication of the particular type of content on that carrier would be subject to that service policy as a result of that content being communicated on that carrier. Furthermore, the operator can also impose different service policies on a per-carrier basis. By way of example, the base station may be set to apply a first service policy on a first carrier when the first carrier is used as a PCell, whereas the base station may also be set to apply a second, different service policy on a second carrier when the second carrier is used as a PCell. Thus, communication of content on the first carrier when the first carrier is used as a PCell will be subject to the first service policy as a result of that content being communicated on the first carrier, whereas communication of content on the second carrier when the second carrier is used as a PCell will be subject to the second service policy as a result of that content being communicated on the second carrier.

Accordingly, in one respect, disclosed herein is a method that involves the base station determining a type of content that will be transmitted between the base station and the UE, where the base station is arranged to operate on a plurality of carrier frequencies. Further, the method involves, based on the determined type of content, the base station (i) selecting a first carrier frequency of the plurality to be a PCell to use in carrier aggregation service for the UE and (ii) selecting a second carrier frequency of the plurality to be an SCell to use in the carrier aggregation service for the UE. And the method involves, responsive to the selecting, the base station providing the UE with the carrier aggregation service concurrently on the selected PCell and the selected SCell.

In another respect, disclosed is a method operable by a base station arranged to operate on a plurality of carrier frequencies and further arranged to serve a UE over an air interface connection between the base station and the UE. According to the method, while serving the UE, the base station determines a type of content that will be transmitted between the base station and the UE over the air interface connection. Further, based on the determined type of content, the base station (i) selects a first carrier frequency of the plurality to be a PCell to use in carrier aggregation service for the UE and (ii) selects a second carrier frequency of the plurality to be an SCell to use in the carrier aggregation service for the UE. Responsive to the selecting, the base station then modifies the air interface connection to encompass the selected PCell and the selected SCell, where the PCell and the SCell are aggregated together so as to provide the UE with the carrier aggregation service through the air interface connection, and where control signaling for communications on both the PCell and the SCell will occur on the PCell.

Still further, in another respect, disclosed is a base station configured to carry out some or all of the operations noted above. In an example arrangement, for instance, the base station includes an antenna structure for radiating to define a coverage area, where the coverage area operates on a plurality of carrier frequencies that are available for use in providing service to UEs on an air interface. Further, the base station includes a controller comprising at least one processing unit, data storage, and program instructions stored in the data storage and executable by the at least one processing unit to carry out operations such as those noted above. In that arrangement, the controller may be configured to, while the base station is serving a UE on the air interface, determine (i) a first type of content that will be transmitted between the base station and the UE and (ii) a second type of content that will be transmitted between the base station and the UE. The controller may be further configured to, based on the determined types of content, select for each type of content, (i) a first carrier frequency of the plurality to be used as a PCell on which the base station will serve the UE with communication of the respective type of content when providing the UE with carrier aggregation service and (ii) a second carrier frequency of the plurality, different from the first carrier frequency, to be used as an SCell on which the base station will serve the UE with communication of another type of content, different from the respective type of content, when providing the UE with carrier aggregation service. And the controller may be further configured to, responsive to the selecting, provide the UE with carrier aggregation service using the selected PCells and the selected SCells, where control signaling for communications on the PCells and the SCells will occur on the PCells.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and apparatus will be described herein in the context of LTE. However, it will be understood that principles of the disclosure can extend to apply in other scenarios as well, such as with respect to other air interface protocols, such as Code Division Multiple Access (CDMA) (e.g., 1×RTT and 1×EV-DO) or Global System for Mobile Communications (GSM), among other possibilities. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
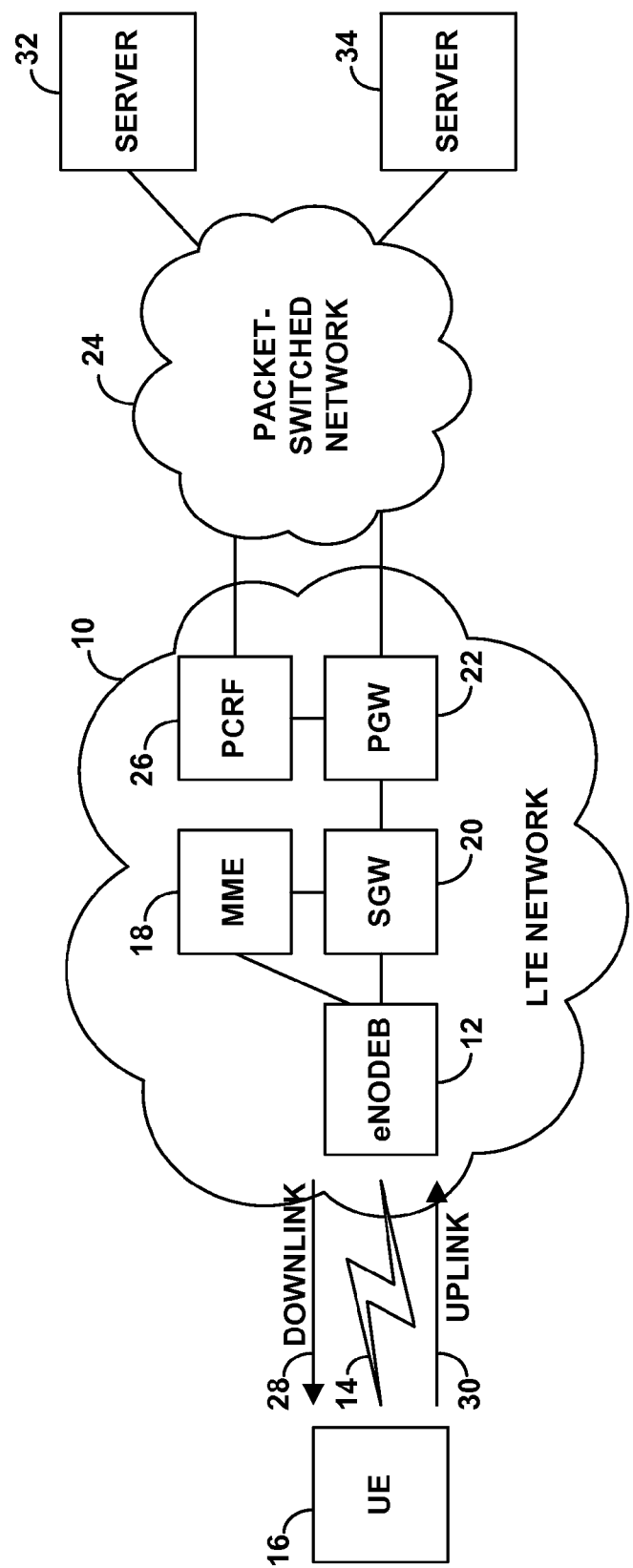
FIG. 1 is a simplified block diagram of a wireless communication system in which the present method and system can be implemented.

Referring to the drawings, as noted above, FIG. 1 is a simplified block diagram of a wireless communication system in which the present method and system can be implemented. In particular, FIG. 1 depicts a representative LTE network 10, which functions primarily to serve UEs with wireless packet data communication service, including possibly voice-over-packet service, but may also provide other functions. As shown, the LTE network includes a base station (eNodeB) 12, which has an antenna structure and associated equipment for providing an LTE coverage area 14 in which to serve UEs such as an example UE 16 as shown. The eNodeB 12 then has a communication interface with a mobility management entity (MME) 18 that functions as a signaling controller for the LTE network. Further, the eNodeB 12 has a communication interface with a serving gateway (SGW) 20, which in turn has a communication interface with a packet-data network gateway (PGW) 22 that provides connectivity with a packet-switched network 24, and the MME has a communication interface with the SGW 20. Still further, the LTE network includes a representative policy server shown as a Policy Charging and Rules Function (PCRF) 26, with which the PGWs are configured to communicate in order to authorize serving of UEs, such as to determine whether to establish particular bearers with UEs and/or what service policy rules to apply on various carriers with respect to those bearers. In practice, the illustrated components of the LTE network may sit as nodes on a private packet-switched network owned by an operator of the LTE network, and thus the various communication interfaces may be logical interfaces through that network.

As illustrated, the air interface of coverage area 14 defines a downlink direction 28 from the eNodeB to the UE and an uplink direction 30 from the UE to the eNodeB. Further, the eNodeB and UE may be configured (e.g., licensed and programmed) to support air interface communication on various particular carriers, which may be FDD or TDD. Each such carrier and/or its particular downlink and uplink channels may be identified by one or more globally unique identifiers per industry standard, so that the eNodeB and a served UE can refer to particular carriers by those identifiers.

According to LTE, each carrier's downlink channel may then define various sub-channels, such as a physical downlink control channel (PDCCH) for carrying scheduling directives and other control signaling from the eNodeB to UEs, a physical downlink shared channel (PDSCH) for carrying scheduled downlink data communication, and a reference channel for carrying a reference signal that UEs can monitor to evaluate coverage quality. Likewise, each carrier's uplink channel may define various sub-channels, such as a physical uplink control channel (PUCCH) for carrying scheduling requests and other control signaling from the UEs to the eNodeB and a physical uplink shared channel (PUSCH) for carrying scheduled uplink data communication.

With this arrangement, when UE 16 enters into coverage of eNodeB 12, the UE may detect the eNodeB's coverage on a particular carrier, and the UE may engage in an attach process or handover process to register with the LTE network on that carrier. For instance, the UE may initially transmit to the eNodeB an attach request, which the eNodeB may pass along to the MME 18, triggering a process of authenticating the UE and establishment of one or more logical bearer connections for the UE between the eNodeB and the PGW 22.

Further, the UE may engage in signaling with the eNodeB to establish a radio-link-layer connection (i.e., air interface connection) on the detected carrier, so that the eNodeB may then serve the UE on that carrier. For instance, the UE and eNodeB may exchange radio-resource-control (RRC) configuration messaging in order to prepare the eNodeB to serve the UE on the carrier and to prepare the UE to be served on the carrier. In this process, the eNodeB may store a context record for the UE, indicating that the eNodeB is serving the UE on the particular carrier, so that the eNodeB may then serve the UE on the indicated carrier (e.g., then exchanging control signaling and bearer traffic with the UE on that carrier) per that context record. Further, the UE may store a context record indicating that the UE is being served on that carrier, so that the UE can then be served on that carrier (e.g., then exchanging control signaling and bearer traffic with the eNodeB on that carrier) per that context record. As such, the radio-link-layer connection could be considered to effectively encompass initially just that one carrier.

In addition, during this initial attach process and/or more likely later while serving the UE, the eNodeB and UE may engage in RRC configuration messaging and/or other processing to modify or otherwise set the UE's radio-link-layer connection to encompass a different number of carriers. In particular, the eNodeB and UE may arrange the UE's radio-link-layer connection to encompass two or more carriers so as to facilitate carrier aggregation service.

There could be various reasons for doing this. By way of example, the eNodeB may base this on a determination that a single carrier on which the UE would be served, such as the carrier on which the UE initially requested attachment and/or initially attached with the eNodeB, is threshold heavily loaded (e.g., that the eNodeB has been scheduling more than a threshold percentage of resources on that carrier, and/or that the eNodeB is serving more than a threshold number of UEs with radio-link-layer connections encompassing that carrier). Or the eNodeB may base this on a determination that the air interface channel conditions between the UE and the eNodeB are threshold good and/or threshold poor (e.g., based on UE-provided channel-quality measurement reports and/or eNodeB evaluation of channel quality). Still further, the eNodeB may base this on a determination that there is a threshold great extent of data buffered for transmission over the air interface between the eNodeB and the UE.

To set or adjust the carriers encompassed by the UE's radio-link-layer connection, the eNodeB may transmit to the UE an RRC connection message (e.g., an initial RRC connection message, or an RRC connection reconfiguration message) that specifies the carriers on which the eNodeB will be serving the UE, identifying each carrier by its global identifier for instance. In particular, to facilitate carrier aggregation service, the eNodeB may specify which carrier will be used as a PCell by designating one such carrier with a PCell-specific index number, and the eNodeB may specify which other carrier(s) will be used as one or more SCells by designating the carrier(s) with SCell-specific index number(s). By way of example, the communication system may be configured such that an index number of 0 (zero) designates a PCell, and index numbers of 1 through 7 designate SCells. The eNodeB may then also update its context record for the UE to indicate that the UE's radio-link-layer connection now encompasses the indicated carriers, so that the eNodeB may then engage in communication with the UE on those carriers. And the UE may responsively update its context record to indicate that the UE's radio-link-layer connection now encompasses the indicated carriers, so that the UE will be prepared to engage in communication with the eNodeB on those carriers.

This or another process could be used to add or remove one or more carriers from a UE's radio-link-layer connection. For example, if the connection currently encompasses just one carrier, the process could be used to change the connection to encompass a different carrier and/or to add one or more additional carriers (e.g., as SCells) so as to facilitate carrier aggregation service. As another example, if the connection currently encompasses two or more carriers, the process could be used to add one or more additional carriers to the connection so as to provide increased carrier aggregation, or to remove one or more carriers from the connection so as to provide reduced carrier aggregation or to switch to single-carrier service. Other examples are possible as well.

As noted above, the present disclosure provides for determining a type of content that will be communicated to or from the UE and using that type of content as a basis to select (i) which of the eNodeB's available carriers to use as the UE's PCell on which the eNodeB will serve the UE with communication of the determined type of content and (ii) which of the eNodeB's available carriers to use as the UE's SCell(s) on which the base station will serve the UE with communication of other types of content. The disclosure then provides for serving the UE concurrently with (i) communication of the determined type of content, as well as control signaling associated with the determined type of content, on the PCell and (ii) communication of other types of content on the selected one or more SCells. This process could be carried out by the eNodeB itself and/or by one or more other network entities, such as with portions of the analysis carried out by an entity outside of the eNodeB and the eNodeB then responsively working to modify the radio-link-layer connection. For simplicity, however, the process will be described here in a scenario where the eNodeB carries out all aspects of the process.

The process may begin in a scenario where the eNodeB is serving the UE in an RRC-connected mode. In that mode, as the eNodeB receives bearer data for the UE (e.g., from the packet-switched network 24 via PGW 22 and SGW 20), the eNodeB may allocate air interface resources within the UE's radio-link-layer connection to carry the data to the UE, and the eNodeB may transmit the data to the UE in accordance with the allocation. Further, as the UE has bearer data to transmit via packet-switched network 24, the UE may transmit scheduling requests to the eNodeB, the eNodeB may allocate air interface resources in the UE's radio-link-layer connection to carry the data from the UE, and the UE may transmit the data to the eNodeB in accordance with the allocation (e.g., for forwarding via SGW 20 and PGW 22 onto network 24).

In this initial state, if the UE's radio-link-layer connection encompasses just one carrier, the signaling and bearer communication would occur on just that one carrier. For instance, the eNodeB may allocate PDSCH and/or PUSCH resources on the carrier to carry the bearer data and may transmit to the UE on a PDCCH of that carrier one or more DCI messages that specify the allocation, and the eNodeB and UE may communicate the data on the allocated resources. Whereas, if the UE's radio-link-layer connection encompasses multiple carriers and thus supports carrier aggregation service on those multiple carriers, the eNodeB may allocate PDSCH and/or PUSCH resources on the multiple carriers concurrently (e.g., distributing the data transmission among resources on the multiple carriers) and may transmit to the UE on a PDCCH of the PCell and perhaps also on a PDCCH of one or more SCells one or more DCI messages that specify the allocation, and the eNodeB and UE may communicate the data on the allocated resources.

In this way, the UE may engage in data communication with various servers or other entities (possibly even other end user devices) on or via packet-switched network 24, with the communication passing through the UE's radio-link-layer connection and through SGW 20, PGW 22, and packet-switched network 24. FIG. 1 depicts two examples of such entities as servers 32 and 34. These servers may take various forms and may be set to communicate data representing various different types of content. By way of example, a representative server might be a web server that communicates web browsing content (e.g., Hypertext Transfer Protocol Secure (HTTPs) communications), an e-mail server that communicates e-mail content, a streaming video server that transmits streaming video content (e.g., movies and television shows, via YouTube, Netflix, Hulu, Amazon, and the like), a game server that communicates game content, an Internet Multimedia Subsystem (IMS) that supports voice calling (e.g., VoIP), and the like. As a specific example, server 32 might be a streaming video server that is operated by one streaming video service provider and that provides streaming video content, and server 34 might be another streaming video server that is operated by another streaming video service provider and that also provides streaming video content. Other examples are possible as well.

To facilitate communication between the UE and such entities, the UE and each entity may each have a network address such as an Internet Protocol (IP) address on network 24. The UE and the entity may thus transmit data to each other in the form of one or more IP data packets, each having a respective header segment specifying a source IP address and a destination IP address, and each having a respective payload segment carrying some or all of the data at issue. Further, when the UE and the entity communicate data representing content of a particular type, such as content associated with a particular application, each packet may further include a transport port number (e.g., a particular Transmission Control Protocol (TCP) port number or User Datagram Protocol (UDP) port number) associated with that content type and/or another designation of the type of content carried by the packet, to facilitate processing by corresponding program logic at the UE and/or at the entity.

The data carried in the payload segment of such packets may be a digitally encoded representation of particular content being communicated between the UE and the entity. Such content may itself be media content of some type, such as video content, web content, voice content, gaming content, or the like. Alternatively, the content may be signaling content, such as Session Initiation Protocol (SIP), Real-Time Streaming Protocol (RTSP), or Hypertext Transfer Protocol (HTTP) messages used for setting up or otherwise controlling certain media content transmission. Such signaling content may then also include data that specifies other type of content that will be communicated to or from the UE. For instance, SIP signaling could carry a Session Description Protocol (SDP) segment that designates a type of content to be communicated to or from the UE.

In accordance with the disclosure, the eNodeB may determine the type of content that will be communicated between the eNodeB and the UE in various ways. By way of example, the eNodeB may accomplish this based on deep packet inspection (DPI) of one or more packets passing to or from the UE, and/or based on various associated signaling or other data.

As an example of this, the eNodeB may read one or more such packets to determine a type of content being carried by such packet(s) and could consider that to be an indication of the type of content that will be communicated between the eNodeB and UE. For instance, the eNodeB could read from one or more such packets a network address of a remote entity with which the UE is communicating and/or a transport port number associated with the type of content, and the eNodeB could map the network address and/or port number to a particular type of content.

To do this, the eNodeB may include or have access to a table that maps various network addresses and/or port numbers to corresponding types of content (e.g., indicating for each network address one or more possible types of content, and further indicating for each port associated with data sent to or from that network address a corresponding type of content), and the eNodeB may be programmed to refer to that table to determine the type of content that will be communicated to or from the UE. Through this process, the eNodeB might thereby determine that such packet data is streaming video content from a particular provider, streaming video content from another particular provider, streaming video content generally, gaming content, voice content, web content, and/or various other types of content such as those noted above for instance.

As another example, the eNodeB could read the payload of one or more such packets and programmatically evaluate the data in the payload to project what type of content will be communicated between the eNodeB and UE. For instance, if the payload carries SIP signaling or the like, the eNodeB could read that signaling to determine an SDP-based indication of type of content that will be communicated to or from the UE, again possibly a type such as one of those noted above. Other examples are possible as well.

In turn, based at least on the determined type of content that will be communicated between the eNodeB and the UE, the eNodeB may select (i) one of the eNodeB's available carriers to use as a PCell on which the base station will serve the UE with communication of the determined type of content and (ii) one or more other available carriers to use as one or more SCells on which the base station will serve the UE with communication of other types of content. The eNodeB may then provide the UE with carrier aggregation service on the selected PCell and the selected SCell(s). Namely, when serving the UE with communication of the determined type of content, the eNodeB may schedule communication of the determined type of content to be on the selected PCell, whereas the eNodeB may schedule communication of other types of content to be on the selected SCell(s).

The selection of the PCell and the one or more SCells could be based on additional factors as well (i.e., in addition to consideration of the determined type of content), such as considerations of the level of load on each of one or more of the eNodeB's available carriers. For instance, as the eNodeB is serving UEs in its coverage area with communications of various types of content, the eNodeB or other network node may monitor the distribution of network resources among the eNodeB's available carriers per type of content. After determining the types of content as discussed above, the eNodeB may, for each determined type of content, (i) identify a carrier to which the highest percentage of network resources in the coverage area have been allocated for that determined type of content, and (ii) select the identified carrier to be the PCell on which the eNodeB will serve the UEs in the coverage area with communication of that determined type of content. Accordingly, any UEs in the coverage area that later engage in communication of that determined type of content will be assigned the same identified carrier as their PCell for carrier aggregation service.

To facilitate the eNodeB's selection of PCells and SCells for various types of content, the eNodeB may maintain or have access to a table or list that maps various types of content to respective carriers to use as PCells (and possibly one or more other respective carriers to use as SCell(s)) when serving UEs with carrier aggregation, and the eNodeB may be programmed to refer to that table to select which available carriers to use as a PCell and one or more SCells for a particular determined type of content. Such a table may, for instance, list various different types of content (e.g., various web browsing or email services, various providers' video streaming services, various online gaming services, and the like) and specify a respective carrier to use as a PCell and one or more carriers to use as one or more SCells per each type of content, so that the eNodeB may select different carriers to aggregate together and use as a PCell and SCells for carrier aggregation depending on which type of content would be communicated to the UE. Such a table may list various different types of content at various levels of granularity. For instance, as noted above, the listed types of content may be classified more broadly as web browsing content, video streaming content, online gaming content, and the like. Further or alternatively, such a table might list various different types of providers of such content (e.g., Outlook and Gmail for email content; Netflix, YouTube, Hulu, etc. for video streaming content) and specify a respective carrier to use as a PCell and one or more carriers to use as one or more SCells per each provider.

TABLE 1

| Type of Content | PCell | SCell 1 | SCell 2 |
|---|---|---|---|
| Web browsing | F2 | F3 | F1 |
| Video streaming | F1 | F2 | F3 |
| Online gaming | F3 | F2 | F1 |

In an example arrangement in which the disclosed process can be implemented, the eNodeB at issue may have three carriers, F1, F2, and F3, available for use in providing UEs with carrier aggregation service. In this arrangement, the eNodeB may have access to a table such as Table 1 depicted above, and may refer to Table 1 when selecting which of the three carriers to use as a PCell and which of the three carriers to use as SCells when providing UEs with carrier aggregation service. Accordingly, for providing a UE with carrier aggregation service, (i) if the eNodeB is serving the UE with communication of web browsing content, the eNodeB would select F2 to be the UE's PCell and would select F1 and/or F3 to be the UE's SCell(s), (ii) if the eNodeB is serving the UE with communication of video streaming content, the eNodeB would select F1 to be the UE's PCell and would select F2 and/or F3 to be the UE's SCell(s), and (iii) if the eNodeB is serving a UE with communication of online gaming content, the eNodeB would select F3 to be the UE's PCell and would select F1 and/or F2 to be the UE's SCell(s). Further, in this example and in others, the selected PCell and the selected SCell(s) could take various forms and have various bandwidth, and could be contiguous or non-contiguous and inter-band and/or intra-band. For instance, the carriers could each be 20 MHz TDD carriers or other carriers including but not limited to those noted above.

In order for the eNodeB to provide the UE with carrier aggregation service concurrently on the selected PCell (i.e., the carrier selected for use as the PCell) and the selected one or more SCells (i.e., the one or more carriers selected for use as the SCell(s)), the eNodeB may modify the radio-link-layer connection to encompass the selected PCell and the selected SCell, where the PCell and the SCell(s) are aggregated together. By way of example, as noted above, the eNodeB may modify the radio-link-layer connection by engaging in RRC connection messaging with the UE, where the eNodeB may specify in an RRC connection message which carrier will be used as the PCell by designating one such carrier with a PCell-specific index number, and the eNodeB may specify which other carrier(s) will be used as the one or more SCells by designating the carrier(s) with SCell-specific index number(s). The eNodeB and UE may then update their context records accordingly.

Through this process, the radio-link-layer connection may change in various ways. By way of example, if, at the initiation of this process, the radio-link-layer connection encompasses one carrier (e.g., if the eNodeB is not initially serving the UE with carrier aggregation), the eNodeB could serve the UE with carrier aggregation by (i) selecting the one carrier to be the UE's PCell and (ii) modifying the radio-link-layer connection by adding one or more carriers to be the UE's SCell(s). As another example, if, at the initiation of this process, the eNodeB is already set to serve the UE with carrier aggregation, the eNodeB could modify the radio-link-layer connection by adding or removing one or more carriers. The eNodeB may then use a new carrier as the UE's PCell (e.g., either a carrier that was added to the radio-link-layer, or another carrier that the radio-link-layer had previously encompassed) and may use one or more other carriers encompassed by the radio-link-layer as the UE's SCell(s).

As discussed above, in some scenarios, communication of both bearer data and control signaling associated with the bearer data may occur on the PCell, whereas only communication of bearer data may occur on the SCell(s). By way of example, the eNodeB may use cross-carrier scheduling to transmit to the UE on a PDCCH of only the PCell one or more DCI messages that specify an allocation of PDSCH resources on both the PCell and at least one SCell, and the eNodeB may communicate the bearer data on the allocated resources. There are other types of control signaling as well, such as control signaling carried on a Physical Hybrid ARQ Indicator Channel (PHICH) of the PCell. As further discussed above, however, it is possible for control signaling to occur on a PDCCH (or other control channel) of the PCell, as well as on a PDCCH (or other control channel) of at least one SCell.

In practice, an eNodeB may impose a service policy on a particular carrier so that when that carrier is used for communication of a particular type of content, the service policy will be imposed with respect to that content. As such, in line with Table 1 and the example arrangement discussed above, the eNodeB may be arranged to impose, on each carrier selected to be a PCell (e.g., F1, F2, or F3, depending on the type of content that is to be communicated), a respective service policy so that all communication of content on that carrier will be subject to the service policy as a result of such content being communicated on that carrier. By way of example, the eNodeB may be arranged to impose a first service policy on F2 when F2 is used as a PCell for serving UEs with communication of web browsing content, whereas the eNodeB may also be arranged to impose a second, different service policy on F1 when F1 is used as a PCell for serving UEs with communication of video streaming content. Thus, when F2 is used as a PCell, communication of web browsing content on F2 will be subject to the first service policy as a result of that content being communicated on F2, whereas when F1 is used as a PCell, communication of video streaming content on F1 will be subject to the second service policy as a result of that content being communicated on F1.

The eNodeB can impose various types of service policies. For example, the eNodeB can impose a service policy to apply, on a particular carrier (e.g., the selected PCell), higher priority to communication of a particular type of content on that carrier and lower priority to communication of other types of content on that carrier. In practice, for instance, by applying the first service policy on F2 when F2 is used as a PCell for serving UEs with communication of web browsing content, the eNodeB may provide higher priority to the communication of the web browsing content on F2 (and/or for control channel signaling associate with the web browsing content), and the eNodeB may provide lower priority to communications of other types of content on F2. Likewise, by applying the second service policy on F1 when F1 is used as a PCell for serving UEs with communication of video streaming content, the eNodeB may provide higher priority to the communication of the video streaming content on F1 (and/or for control channel signaling associate with the video streaming content), and the eNodeB may provide lower priority to communications of other types of content on F1. As another example, the eNodeB could limit the extent of resources (e.g., resource blocks) that it allocates per unit time on a particular carrier, in order to help conserve use of the carrier for a greater number of UEs for instance.

Other types of service policies are possible as well. For example, the eNodeB could impose a service policy to apply, on a particular carrier, a minimum or maximum modulation and coding scheme (MCS) limit, a minimum or maximum data rate limit (e.g., based on the resource block allocation rate limit and the MCS limit), a minimum or maximum transmission power limit, a minimum or maximum Hybrid Automatic Repeat Request (HARM) retransmission limit, a minimum or maximum block error rate limit, or various other operational parameters that may or may not involve minimum or maximum limits.

Furthermore, in some scenarios, it may be desirable for an operator of a wireless communication system such as the example arrangement described above to have the eNodeB serve UEs with certain important or sensitive types of content at a high quality. To facilitate this, the eNodeB could schedule communication of such important or sensitive content to be on a lower carrier of the eNodeB's available carriers because, in practice, bearer communication on lower carrier frequencies may facilitate higher channel quality and decreased packet loss during bearer communication by providing improved radio frequency propagation or the like, and may thereby likely increase bearer communication quality. Whereas, bearer communication on higher carrier frequencies may result in channel quality degradation and higher packet losses by providing reduced radio frequency propagation or the like, and may thereby likely decrease bearer communication quality.

In particular, this may be desirable in a scenario in which the eNodeB serves a UE with carrier aggregation. Thus, in accordance with the disclosed process, the eNodeB may be arranged to select, from its available carriers, a lower carrier to be used as the UE's PCell based on the type of content that will be communicated between the eNodeB and the UE being one type of content (e.g., more important content). Conversely, the eNodeB may be arranged to select, from its available carriers, a higher carrier to be used as the UE's PCell based on the type of content that will be communicated between the eNodeB and the UE being another type of content (e.g., less important content). By way of example, referring again to Table 1, the operator may desire for the eNodeB to serve UEs with high quality video streaming content on a low carrier. Thus, for providing the UE with carrier aggregation service, if the eNodeB is serving the UE with communication of video streaming content, the eNodeB may be arranged to select F1 to be the UE's PCell based on (i) the type of content being video streaming content and (ii) F1 being a lower carrier compared to the rest of the eNodeB's available carriers. Other examples are possible as well.

Figure 2:
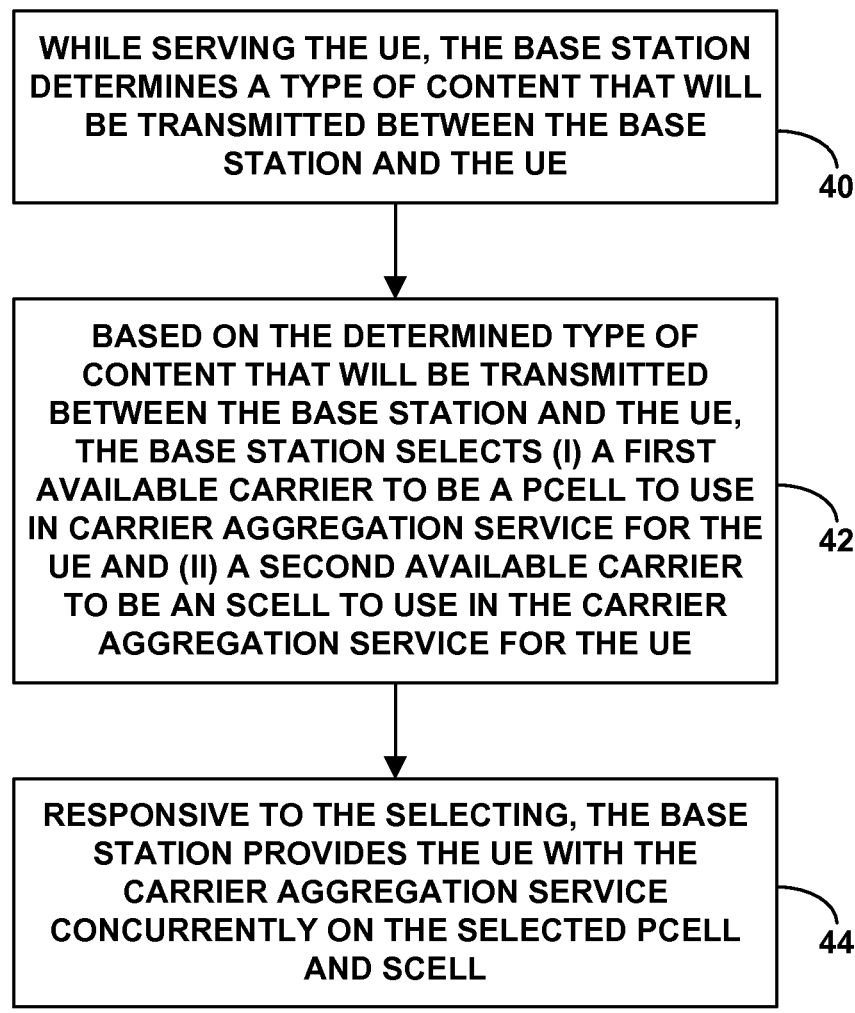
FIG. 2 is a flow chart depicting example operations in accordance with the disclosure.

FIG. 2 is next a flow chart depicting an example set of operations that can be carried out by a base station such as eNodeB 12 that is arranged to operate on a plurality of carrier frequencies and that is serving a UE. As shown in FIG. 2, at block 40, while the base station is serving the UE, the base station determines a type of content that will be transmitted between the base station and the UE. At block 42, based on the determined type of content that will be transmitted between the base station and the UE, the base station selects (i) a first available carrier of the plurality to be a PCell to use in carrier aggregation service for the UE and (ii) a second available carrier of the plurality to be an SCell to use in the carrier aggregation service for the UE. And at block 44, responsive to the selecting, the base station provides the UE with the carrier aggregation service con-currently on the selected PCell and SCell. Various other features described above could be incorporated into this method as well.

Figure 3:
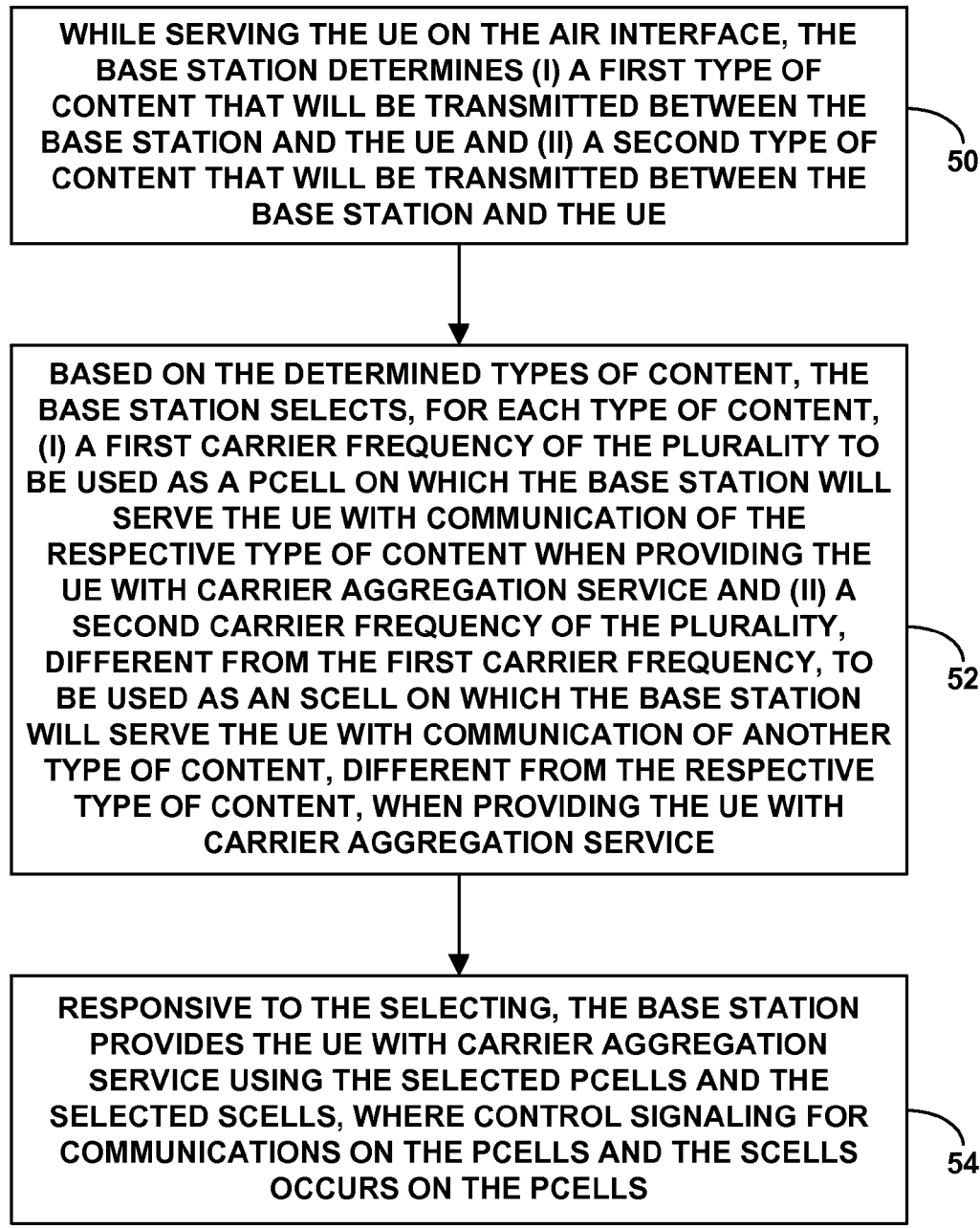
FIG. 3 is another flow chart depicting example operations in accordance with the disclosure.

FIG. 3 is next a flow chart depicting another example set of operations that can be carried out by a base station such as eNodeB 12 in an implementation of this process. As shown in FIG. 3, at block 50, while serving the UE on the air interface, the base station determines (i) a first type of content that will be transmitted between the base station and the UE and (ii) a second type of content that will be transmitted between the base station and the UE. Then, at block 52, based on the determined types of content, the base station selects, for each type of content, (i) a first carrier frequency of the plurality to be used as a PCell on which the base station will serve the UE with communication of the respective type of content when providing the UE with carrier aggregation service and (ii) a second carrier frequency of the plurality, different from the first carrier frequency, to be used as an SCell on which the base station will serve the UE with communication of another type of content, different from the respective type of content, when providing the UE with carrier aggregation service. And at block 54, responsive to the selecting, the base station provides the UE with carrier aggregation service using the selected PCells and the selected SCells, where control signaling for communications on the PCells and the SCells occurs on the PCells (e.g., using cross-carrier scheduling of PDCCH/PUCCH communications on the PCell and PDSCH/PUSCH communications on the SCell). Thus, if the UE is being served with communication of the first type of content, the base station may provide the UE with carrier aggregation service concurrently on the PCell and the SCell selected for the first type of content. Whereas, if the UE is being served with communication of the second type of content, the base station may provide the UE with carrier aggregation service concurrently on the PCell and the SCell selected for the second type of content.

Various other features described above could be incorporated into this method as well. For instance, the base station may be arranged to impose, on each carrier selected to be a PCell, a respective service policy rule on that carrier, so that when the base station serves UEs with communication of a particular type of content on that carrier, the respective service policy would be imposed with respect to the particular type of content.

Figure 4:
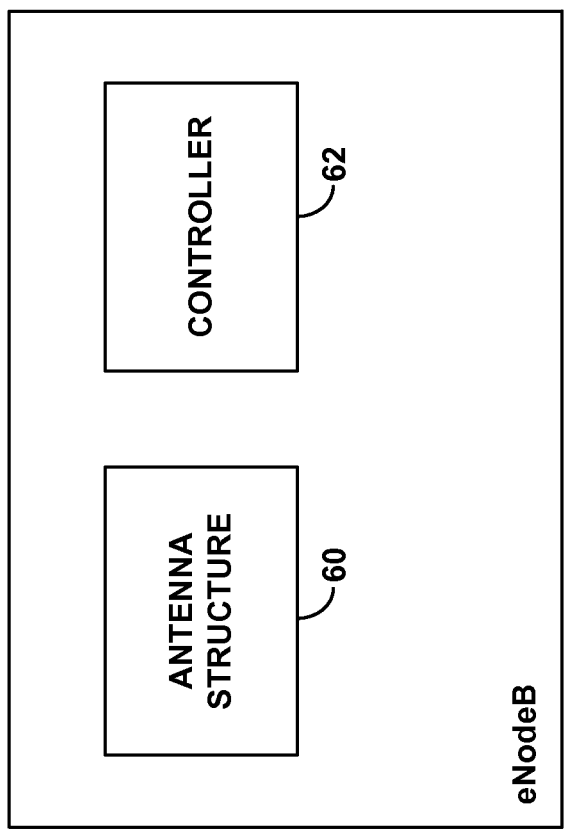
FIG. 4 is a simplified block diagram of an example base station operable in accordance with the disclosure.

Finally, FIG. 4 is a simplified block diagram of a base station of an example eNodeB (e.g., macro eNodeB, small cell, or other type of base station), showing some of the components that such a device may include in order to carry out these and other operations. As shown, the example eNodeB includes an antenna structure 60 that radiates to define an air interface coverage area for serving UEs, where the coverage area operates on a plurality of carriers. Further, the example base station includes a controller 62 that manages wireless communication via the antenna structure.

In practice, for instance, the controller 62 may include at least one processing unit, data storage, and program instructions stored in the data storage and executable by the at least one processing unit to carry out various operations described herein. Further, in line with the discussion above, the data storage may include a list or table that correlates various types of content with respective carriers of the plurality of available carriers to use as PCells and SCells for serving UEs with communication of those types of content in carrier aggregation.

Controller 62 could be implemented using hardware, software, and/or firmware. For example, controller 62 could include one or more processors and a non-transitory computer readable medium (e.g., volatile and/or non-volatile memory) that stores machine language instructions or other executable instructions. The instructions, when executed by the one or more processors, may cause controller 62, and thus the eNodeB, to carry out the various base station operations described herein.

While various aspects have been disclosed herein, other aspects will be apparent to those skilled in the art. The various aspects disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method operable by a base station while the base station is serving a user equipment device (UE), wherein the base station is arranged to operate on a plurality of carrier frequencies, the method comprising:
   the base station determining a type of content that will be transmitted between the base station and the UE;
   the base station starting to provide the UE with carrier aggregation service;
   the base station using the determined type of content as a basis for (i) determining which carrier frequency of the plurality to use as a primary component carrier (PCell) for the carrier aggregation service and (ii) determining which carrier frequency of the plurality to use as a secondary component carrier (SCell) for the carrier aggregation service; and
   responsive to using the determined type of content as a basis for determining which carrier frequencies to use as the PCell and the SCell, the base station providing the UE with the carrier aggregation service concurrently on the selected PCell and the SCell.

2. The method of claim 1, wherein the PCell is a carrier frequency on which the base station will serve the UE with communication of the determined type of content when providing the UE with the carrier aggregation service, and wherein the base station is set to apply a first service policy rule on the PCell such that, by serving the UE with the communication of the determined type of content on the PCell, the base station applies the first service policy rule with respect to the communication of the determined type of content.

3. The method of claim 2, wherein the base station applying the first service policy rule on the PCell comprises the base station giving (i) higher priority to the communication of the determined type of content on the PCell and (ii) lower priority to transmissions of other types of content on the PCell.

4. The method of claim 1, wherein providing the UE with the carrier aggregation service concurrently on the PCell and the SCell comprises, when the base station is serving the UE with communication of the determined type of content, (i) scheduling transmissions of the determined type of content between the UE and the base station to be on the PCell and (ii) scheduling transmissions of another type of content between the UE and the base station to be on the SCell.

5. The method of claim 1, wherein determining the type of content that will be transmitted between the base station and the UE comprises determining the type of content based on data within one or more data packets flowing to or from the UE.

6. The method of claim 5, wherein the one or more data packets includes a network address, and wherein determining the type of content based on data within the one or more data packets flowing to or from the UE comprises determining the type of content based at least on the network address.

7. The method of claim 6, wherein the one or more data packets further includes a transport port number, and wherein determining the type of content based on data within the one or more data packets flowing to or from the UE comprises determining the type of content based further on the transport port number.

8. The method of claim 5, wherein using the determined type of content as a basis for determining which carrier frequency of the plurality to use as the PCell for the carrier aggregation service comprises referring to mapping data that correlates each of various types of content with a respective carrier frequency to determine, based on the determined type of content, the respective carrier frequency to use as the PCell.

9. A method operable by a base station while the base station is serving a user equipment device (UE) over an air interface connection between the base station and the UE, wherein the base station is arranged to operate on a plurality of carrier frequencies, the method comprising:
   the base station determining a type of content that will be transmitted between the base station and the UE over the air interface connection;
   the base station starting to provide the UE with carrier aggregation service;
   the base station using the determined type of content as a basis for (i) determining which carrier frequency of the plurality to use as a primary component carrier (PCell) for the carrier aggregation service and (ii) determining which carrier frequency of the plurality to use as a secondary component carrier (SCell) for the carrier aggregation service; and
   responsive to using the determined type of content as a basis for determining which carrier frequencies to use as the PCell and the SCell, the base station modifying the air interface connection to encompass the PCell and the SCell, wherein the PCell and the SCell are aggregated together so as to provide the UE with the carrier aggregation service through the air interface connection, and wherein control signaling for communications on both the PCell and the SCell occurs on the PCell.

10. The method of claim 9, wherein modifying the air interface connection comprises (i) transmitting from the base station to the UE a radio-resource-control (RRC) configuration message that specifies the carrier frequency to be used as the PCell and the carrier frequency to be used as the SCell, whereby the transmitted RRC configuration message notifies the UE that air interface communication between the base station and the UE will occur on the specified carrier frequencies, and (ii) updating a UE context record at the base station to indicate that the air interface connection encompasses the specified carrier frequencies,
   whereby the base station and UE are then set to communicate with each other on the specified carrier frequencies.

11. The method of claim 9, further comprising:
   when the base station is providing the UE with the carrier aggregation service through the air interface connection and serving the UE with communication of the determined type of content, (i) the base station scheduling transmissions of the determined type of content between the UE and the base station to be on the PCell, and (ii) the base station scheduling transmissions of another type of content between the UE and the base station to be on the SCell.

12. The method of claim 9, wherein the PCell is a carrier frequency on which the base station will serve the UE with communication of the determined type of content when providing the UE with the carrier aggregation service, and wherein the base station is set to apply a first service policy rule on the PCell such that, by serving the UE with the communication of the determined type of content on the PCell, the base station applies the first service policy rule with respect to the communication of the determined type of content.

13. The method of claim 12, wherein the base station applying the first service policy rule on the PCell comprises the base station giving (i) higher priority to the communication of the determined type of content on the PCell and (ii) lower priority to transmissions of other types of content on the PCell.

14. The method of claim 9, wherein the PCell and the SCell are contiguous.

15. The method of claim 9, wherein the PCell and the SCell are non-contiguous.

16. A base station comprising:
an antenna structure for radiating to define a coverage area, wherein the coverage area operates on a plurality of carrier frequencies that are available for use in providing service to user equipment devices (UEs) on an air interface; and
a controller comprising at least one processing unit, data storage, and program instructions stored in the data storage and executable by the at least one processing unit to carry out operations, the operations comprising:
while the base station is serving a UE on the air interface:
determining (i) a first type of content that will be transmitted between the base station and the UE and (ii) a second type of content that will be transmitted between the base station and the UE;
starting to provide the UE with carrier aggregation service;
using the determined types of content as a basis for determining, for each type of content, (i) which carrier frequency of the plurality to use as a primary component carrier (PCell) for serving the UE with communication of the respective type of content when providing the UE with the carrier aggregation service and (ii) which carrier frequency of the plurality, different from the PCell, to use as a secondary component carrier (SCell) for serving the UE with communication of another type of content, different from the respective type of content, when providing the UE with the carrier aggregation service; and
responsive to using the determined types of content as a basis for determining which carrier frequencies to use as the PCells and the SCells, providing the UE with the carrier aggregation service using the PCells and the SCells, wherein control signaling for communications on the PCells and the SCells occurs on the PCells.

17. The base station of claim 16, wherein providing the UE with the carrier aggregation service using the PCells and the SCells comprises:
when the UE is being served with communication of the first type of content, providing the UE with the carrier aggregation service concurrently on the PCell and the SCell determined for the first type of content; and
when the UE is being served with communication of the second type of content, providing the UE with the carrier aggregation service concurrently on the PCell and the SCell determined for the second type of content.

18. The base station of claim 16, wherein the base station is set to apply, on each carrier frequency to be used as a PCell, a respective service policy rule on that carrier frequency, such that, by serving the UE with the communication of the respective type of content on that carrier frequency, the base station applies the respective service policy rule with respect to the communication of the respective type of content.

19. The base station of claim 16, wherein using the determined types of content as a basis for determining, for each type of content, which carrier frequencies to use as the PCell and the SCell comprises using the determined types of content as a basis for determining, for each type of content, which carrier frequencies to use as the PCell and the SCell by referring to a list, maintained by the base station, that correlates each of various types of content with a respective carrier frequency to use as a PCell when serving the UE with communication of a respective type of content.

20. The base station of claim 16, wherein determining the first and second types of content that will be transmitted between the base station and the UE comprises determining the first and second types of content based on data within one or more data packets flowing to or from the UE.

\* \* \* \* \*